(12) United States Patent
Nuernberger et al.

(10) Patent No.: US 10,275,668 B1
(45) Date of Patent: Apr. 30, 2019

(54) SYSTEM FOR COLLISION DETECTION AND OBSTACLE AVOIDANCE

(71) Applicant: HRL Laboratories, LLC, Malibu, CA (US)

(72) Inventors: Benjamin Nuernberger, Granada Hills, CA (US); Deepak Khosla, Camarillo, CA (US); Kyungnam Kim, Oak Park, CA (US); Yang Chen, Westlake Village, CA (US); Fredy Monterroza, Canoga Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 15/271,025

(22) Filed: Sep. 20, 2016

Related U.S. Application Data

(60) Provisional application No. 62/221,523, filed on Sep. 21, 2015.

(51) Int. Cl.

| | | |
|---|---|---|
| *G06K 9/00* | (2006.01) | |
| *G06K 9/20* | (2006.01) | |
| *G06T 7/00* | (2017.01) | |
| *G06T 7/20* | (2017.01) | |
| *H04N 7/18* | (2006.01) | |
| *G05D 1/00* | (2006.01) | |

(52) U.S. Cl.
CPC ....... *G06K 9/00805* (2013.01); *G05D 1/0088* (2013.01); *G06K 9/2054* (2013.01); *G06T 7/0024* (2013.01); *G06T 7/2066* (2013.01); *H04N 7/183* (2013.01); *B64C 2201/024* (2013.01); *G06T 2207/10016* (2013.01)

(58) Field of Classification Search
CPC ............ G06K 9/00805; G06K 9/2054; G05D 1/0088; G06T 7/0024; G06T 7/2066
See application file for complete search history.

(56) References Cited

U.S. PATENT DOCUMENTS

| | | | | |
|---|---|---|---|---|
| 2010/0305857 | A1* | 12/2010 | Byrne | ........................ G06T 7/73 701/301 |
| 2015/0243044 | A1* | 8/2015 | Luo | ........................ G06T 7/2033 382/107 |

OTHER PUBLICATIONS

Horn, Hierarchical framework for direct gradient-based time-to-contact estimation, IEEE, 2009.*

B. K. Horn, Y. Fang and I. Masaki, "Time to contact relative to a planar surface," in IEEE Intelligent Vehicles Symposium, 2007, pp. 68-74.

B. K. Horn, Y. Fang and I. Masaki, "Hierarchical framework for direct gradient-based time-to-contact estimation," in IEEE Intelligent Vehicles Symposium, 2009, pp. 1394-1400.

(Continued)

*Primary Examiner* — Ruiping Li
(74) *Attorney, Agent, or Firm* — Tope-McKay & Associates

(57) ABSTRACT

Described is a system for collision detection and avoidance estimation using sub-region based optical flow. During operation, the system estimates time-to-contact (TTC) values for an obstacle in multiple regions-of-interest (ROI) in successive image frames as obtained from a monocular camera. Based on the TTC values, the system detects if there is an imminent obstacle. If there is an imminent obstacle, a path for avoiding the obstacle is determined based on the TTC values in the multiple ROI. Finally, a mobile platform is caused to move in the path as determined to avoid the obstacle.

12 Claims, 4 Drawing Sheets

(56) References Cited

OTHER PUBLICATIONS

M. S. Darms, P. E. Rybski, C. Baker and C. Urmson, "Obstacle detection and tracking for the urban challenge," in IEEE Transactions on Intelligent Transportation Systems, 2009, pp. 475-485.

G. Alenya, A. Nègre and J. L. Crowley, "A comparison of three methods for measure of time to contact," in IEEE/RSJ International Conference on Intelligent Robots and Systems, 2009, pp. 4565-4570.

H. Alvarez, L. Paz, J. Sturm and D. Cremers, "Collision Avoidance for Quadrotors with a Monocular Camera," in International Symposium on Experimental Robotics, 2014, pp. 195-209.

G. De Croon, E. De Weerdt, C. De Wagter, B. Remes and R. Ruijsink, "The appearance variation cue for obstacle avoidance," in IEEE Transactions on Robotics, 2012, pp. 529-534.

J.-O. Lee, K.-H. Lee, S.-H. Park, S.-G. Im and J. Park, "Obstacle avoidance for small UAVs using monocular vision," in Aircraft Engineering and Aerospace Technology, 2011, pp. 397-406.

T. Mori and S. Scherer, "First results in detecting and avoiding frontal obstacles from a monocular camera for micro unmanned aerial vehicles," in IEEE International Conference on Robotics and Automation (ICRA), 2013, pp. 1750-1757.

A. Negre, C. Braillon, J. L. Crowley and C. Laugier, "Real-time time-to-collision from variation of intrinsic scale," in Experimental Robotics, 2008, pp. 75-84.

J.-C. Zufferey and D. Floreano, "Fly-inspired visual steering of an ultralight indoor aircraft," in IEEE Transactions on Robotics, 2006, pp. 137-146.

C. Bills, J. Chen and A. Saxena, "Autonomous MAV flight in indoor environments using single image perspective cues," in IEEE international conference on Robotics and automation (ICRA), 2011, pp. 5776-5783.

S. Pundlik, E. Peli and G. Luo, "Time to collision and collision risk estimation from local scale and motion," in Advances in Visual Computing, 2011, pp. 732-741.

\* cited by examiner

SYSTEM FOR COLLISION DETECTION AND OBSTACLE AVOIDANCE

GOVERNMENT RIGHTS

This invention was made with government support under U.S. Government Contract Number SYNAPSE HR0011-09-C-0001. The government has certain rights in the invention.

CROSS-REFERENCE TO RELATED APPLICATIONS

This is a non-provisional patent application of 62/221,523, filed on Sep. 21, 2015, the entirety of which is hereby incorporated by reference.

BACKGROUND OF INVENTION

(1) Field of Invention

The present invention relates to a system for collision detection and avoidance and, more particularly, to a system for collision detection and avoidance estimation using sub-region based optical flow through use of a monocular camera.

(2) Description of Related Art

Obstacle detection and avoidance is a crucial task that is required to realize autonomous robots. Some robotic systems utilize powerful sensors, such as Light Detection and Ranging (LiDAR) or Radio Detection and Ranging (RADAR) sensors (See the List of Incorporated Literature References, Literature Reference No. 3), that have the ability to provide accurate estimation of looming obstacle collisions. The main problem with using these sensors, however, is that their size, weight, or power (SWAP) requirements are too high for certain robotics applications, such as autonomous micro aerial vehicles (MAV). As a result, researchers have attempted to use smaller sensors such as monocular cameras to detect and avoid looming obstacles (See Literature Reference Nos. 1, and 4-10). Monocular cameras achieve the low SWAP requirements for MAVs. However, one of the main challenges with using monocular cameras is that each camera frame by itself inherently cannot provide depth data from the scene. Thus, depth cues and subsequent camera frames are typically used to give an estimation of the depth of the scene. Given this depth (and the change in depth over time), onecan estimate a time-to-contact or time-to-collision (TTC) value which can be used to detect and avoid looming obstacles.

Monocular obstacle detection methods can be broken into several categories. For example, optical flow based methods are bio-inspired and work by observing when the optical flow increases pass a certain threshold, thus triggering an obstacle detection (see Literature Reference No. 10). The main downside with this approach is that it does not work well for frontal obstacles, i.e., obstacles that appear close to the optical axis of the camera. Stereo and structure from motion based methods recover the depth of the scene and thus can determine if there is an obstacle nearby (see Literature Reference No. 7). Dense methods for depth recovery have recently been demonstrated, however they typically require powerful GPUs and offline processing (see Literature Reference No. 5).

Monocular cues can also be used to detect obstacles. Perspective lines have recently been used for autonomous MAV flight; however, perspective lines are generally only found in urban environments and thus limit its usefulness for more natural scenes (see Literature Reference No. 11). Entropy based methods for detecting variations in textures have also been explored (see Literature Reference No. 6), but these make the assumption that obstacles are for the most part homogenous when viewed close up.

The relative size monocular cue has also been a popular method for monocular obstacle detection (see Literature Reference Nos. 4, 8, 9, 12, 1, and 2). Negre et al. (see Literature Reference No. 9) was perhaps the first to use feature-based tracking to detect looming obstacles by looking at the variation of intrinsic scale of a feature point over time. Mori and Alenya (see Literature Reference Nos. 8 and 4) used other feature-based tracking methods to similarly detect an increase in the size of an image feature, which thus triggered an obstacle detection.

Horn et al. (see Literature Reference Nos. 1 and 2), however, argued that feature based approaches are inherently too noisy to be used for TTC estimation. Instead, Horn et al. took the approach of estimating the TTC by assuming the obstacle is a planar surface and the camera does not rotate, and then by estimating the TTC from a least squares geometrical approach. By filtering which pixels are used for the TTC calculation based on a region segmentation and time derivative threshold, they were able to achieve fairly good results for a static camera. The process as described by Horn et al. was limited to a single region (i.e., was not used with multiple regions-of-interest (ROI)) and did not account for a rotating camera.

Thus, a continuing need exists for a collision detection and avoidance system that segments the TTC estimation into several sub-regions or ROI, as well as one that provides robustness against camera rotations by adjusting for it via integration of gyroscope and inertial measurement unit (IMU) sensor data.

SUMMARY OF INVENTION

This disclosure provides a system for collision detection and avoidance. The system includes one or more processors and a memory. The memory is a non-transitory computer-readable medium (e.g., hard drive, etc.) having executable instructions encoded thereon, such that upon execution of the instructions, the one or more processors perform several operations, including estimating time-to-contact (TTC) values for an obstacle in multiple regions-of-interest (ROI) in successive image frames as obtained from a monocular camera; based on the TTC values, detecting if there is an imminent obstacle; if there is an imminent obstacle, determining a path for avoiding the obstacle based on the TTC values in the multiple ROI; and causing a mobile platform to move in the path as determined to avoid the obstacle.

In another aspect, the system adjusts the successive image frames to undo frame-to-frame camera rotation. Further, adjusting the successive image frames further comprises operations of determining a frame-to-frame rotation in a camera coordinate frame based on a gyroscope-to-camera coordinate frame transformation and a frame-to-frame rotation in a gyroscope coordinate frame; and determining new pixel locations in a current frame based on the frame-to-frame rotation in the camera coordinate frame.

In another aspect, in estimating TTC values, the estimation is based on planar surfaces.

In yet another aspect, detecting if there is an imminent obstacle is determined using a moving average of the TTC values.

Additionally, the multiple ROI includes a center ROI. Further, in detecting if there is an imminent obstacle, the TTC values are analyzed for the center ROI over a previous N frames, with an obstacle determined to be imminent if the TTC values are below a threshold for a predetermined number of frames.

In yet another aspect, determining a path for avoiding the obstacle is based on a mean and standard deviation of the TTC values in different ROIs.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
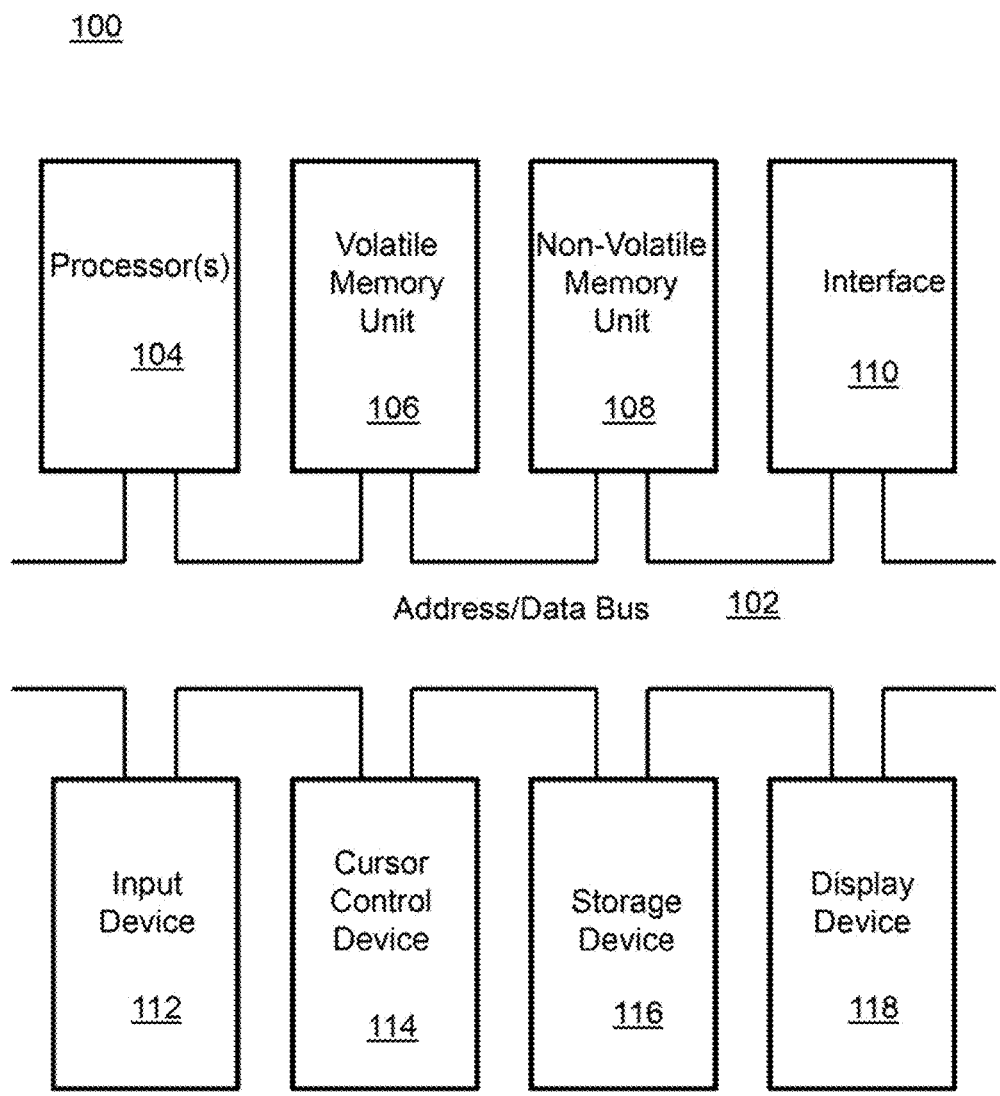
FIG. 1 is a block diagram depicting the components of a system according to various embodiments of the present invention.

The present invention relates to a system for collision detection and avoidance and, more particularly, to a system for collision detection and avoidance estimation using sub-region based optical flow through use of a monocular camera. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) LIST OF INCORPORATED LITERATURE REFERENCES

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

[1] B. K. Horn, Y. Fang and I. Masaki, "Time to contact relative to a planar surface," in *IEEE Intelligent Vehicles Symposium*, 2007.

[2] B. K. Horn, Y. Fang and I. Masaki, "Hierarchical framework for direct gradient-based time-to-contact estimation," in *IEEE Intelligent Vehicles Symposium*, 2009.

[3] M. S. Darms, P. E. Rybski, C. Baker and C. Urmson, "Obstacle detection and tracking for the urban challenge," in *IEEE Transactions on Intelligent Transportation Systems*, 2009.

[4] G. Alenya, A. Négre and J. L. Crowley, "A comparison of three methods for measure of time to contact," in *IEEE/RSJ International Conference on Intelligent Robots and Systems*, 2009.

[5] H. Alvarez, L. Paz, J. Sturm and D. Cremers, "Collision Avoidance for Quadrotors with a Monocular Camera," in *International Symposium on Experimental Robotics*, 2014.

[6] G. De Croon, E. De Weerdt, C. De Wagter, B. Remes and R. Ruijsink, "The appearance variation cue for obstacle avoidance," in *IEEE Transactions on Robotics*, 2012.

[7] J.-O. Lee, K.-H. Lee, S.-H. Park, S.-G. Im and J. Park, "Obstacle avoidance for small UAVs using monocular vision," in *Aircraft Engineering and Aerospace Technology*, 2011.

[8] T. Mori and S. Scherer, "First results in detecting and avoiding frontal obstacles from a monocular camera for micro unmanned aerial vehicles," in *IEEE International Conference on Robotics and Automation (ICRA)*, 2013.

[9] A. Negre, C. Braillon, J. L. Crowley and C. Laugier, "Real-time time-to-collision from variation of intrinsic scale," in *Experimental Robotics*, 2008.

[10] J.-C. Zufferey and D. Floreano, "Fly-inspired visual steering of an ultralight indoor aircraft," in *IEEE Transactions on Robotics*, 2006.

[11] C. Bills, J. Chen and A. Saxena, "Autonomous MAV flight in indoor environments using single image perspective cues," in *IEEE international conference on Robotics and automation (ICRA)*, 2011.

[12] S. Pundlik, E. Peli and G. Luo, "Time to collision and collision risk estimation from local scale and motion," in *Advances in Visual Computing*, 2011.

(2) PRINCIPAL ASPECTS

Various embodiments of the invention include three "principal" aspects. The first is a system for collision detection and avoidance estimation using sub-region based optical flow. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 is any system operable for performing or causing to be performed the operations or actions as described herein. For example, the computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device, such as sensors, etc. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
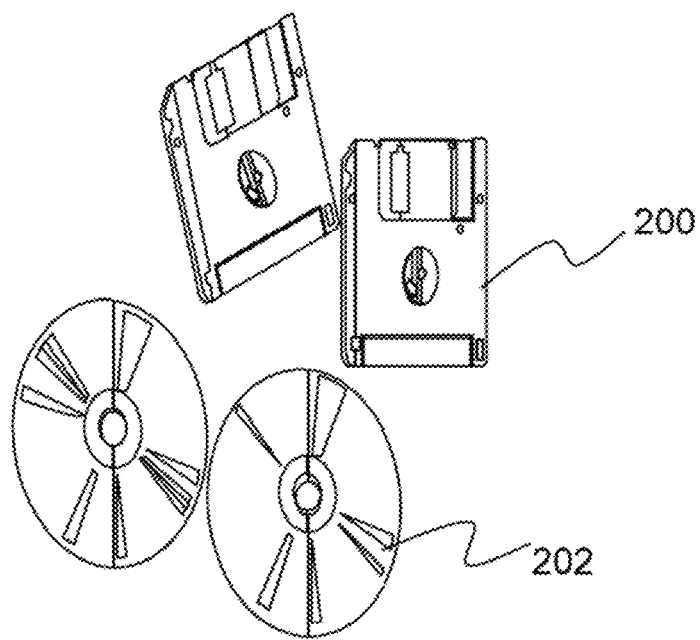
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) INTRODUCTION

Figure 3:
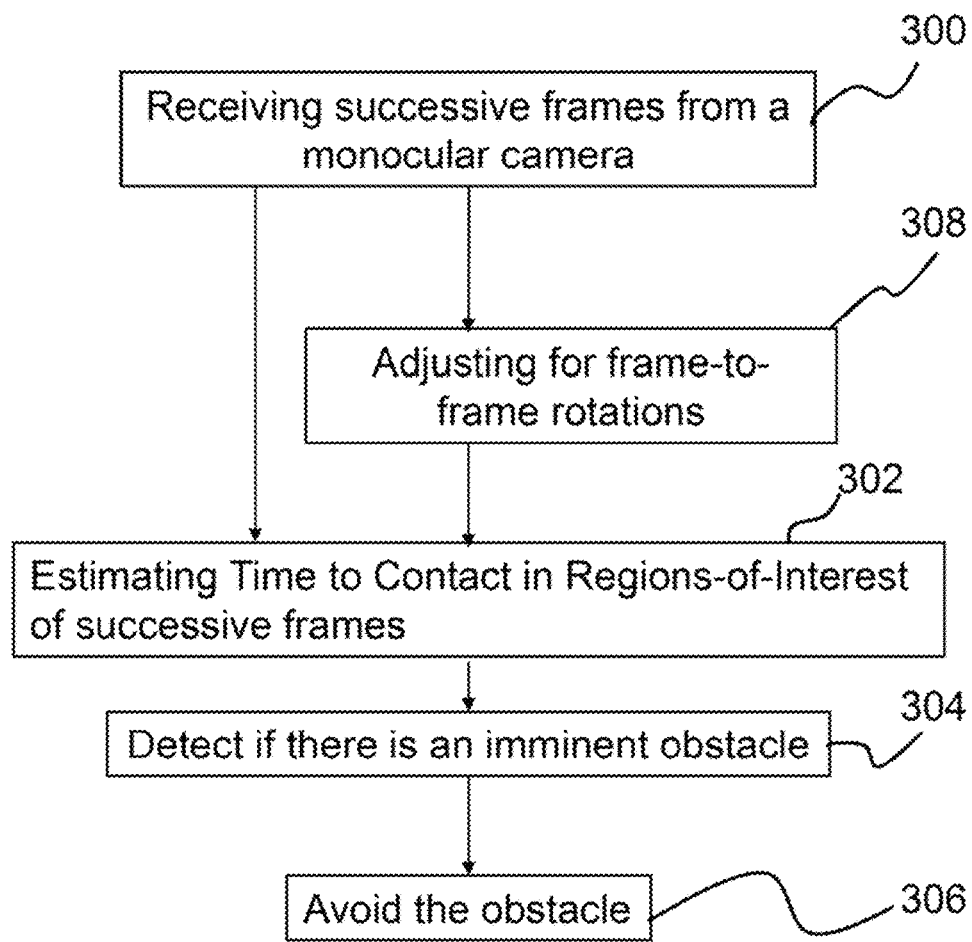
FIG. 3 is a flowchart illustrating a process according to various embodiments of the present invention.

As shown in FIG. 3, this disclosure provides a system for detecting and avoiding obstacles via analyzing successive frames obtained from a monocular camera 300. The system uses the direct gradient-based time-to-contact (TTC) estimation 302 approach for planar surfaces, applied to various regions-of-interest (ROI) of successive image frames. By estimating the TTC 302 in certain ROI, the system can detect 304 if there is an imminent obstacle. Furthermore, by estimating the TTC 302 in different ROI, the system is able to make a calculated choice for avoiding 306 the obstacle. Lastly, by calculating the TTC for various ROI over many frames and also adjusting for frame-to-frame rotations 308 via gyroscope or inertial measurement unit (IMU) data integration, the system achieves robustness in obstacle detection due to noise from the image capture process and inherent limitations of the direct gradient-based TTC estimation approach for planar surfaces.

Figure 4:
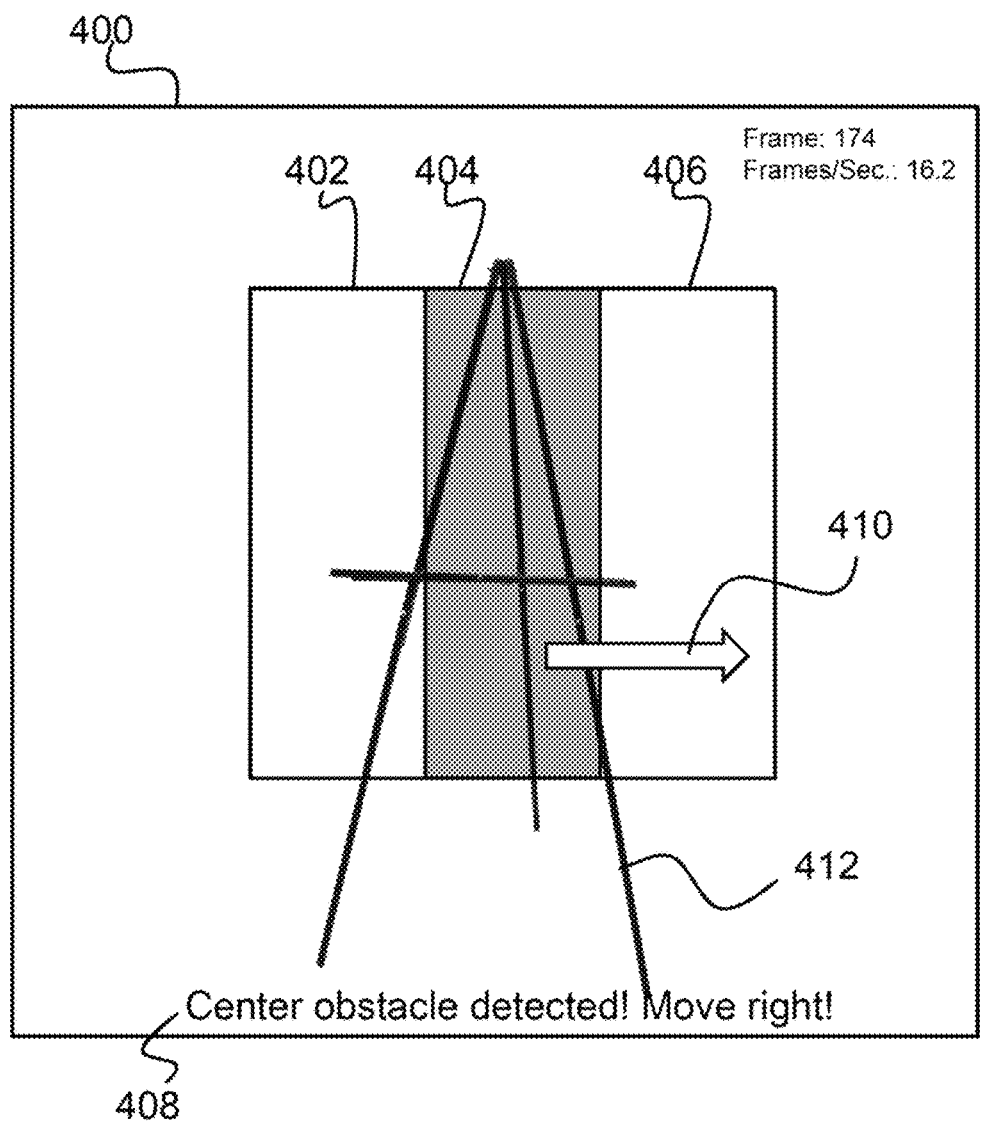
FIG. 4 is an illustration of an output of the system according to various embodiments of the present invention.

FIG. 4, for example, provides an example of the output view of the system. Specifically, FIG. 4 illustrates a current monocular camera frame 400, overlaid with 3 ROI 402, 404, and 406 and text 408 and visualizations 410 showing an obstacle detection and movement direction to avoid the obstacle 412. The opacity in the ROIs 402, 404, and 406 indicates coarsely the chance that there is an obstacle detected in that ROI (for a more detailed explanation see the corresponding section below). Once an obstacle 412 is detected, the ROI 402 fills (red, or any other desired color) with an opacity of 50% (or any predetermined percentage). Furthermore, based on the mean and standard deviation of the TTC values from the left 402 and right 406 ROI columns, the system determines which direction to move. Additional logic can be implemented if desired for making this choice of direction. In the non-limiting example shown in FIG. 4, more than 15 TTC values must be below an "unsafe TTC" threshold for the past 30 frames in order for an "obstacle detected" trigger to occur. These amounts are parameters that can be tuned through training under the operational environments as needed.

As noted above, the system is a monocular obstacle detection and avoidance system. Using a monocular camera is useful for autonomous robots (mobile platforms) that have strict requirements for the size, weight, and power (SWAP) of the robotic system. Thus, the system can be implemented in any mobile platform that requires autonomous obstacle detection and avoidance with a low SWAP requirement. For example, autonomous micro aerial vehicles (MAVs), due to their low SWAP requirements, are a natural fit for this invention. The ability to detect and avoid obstacles with a monocular camera adds much value to any autonomous MAV system. By having a low SWAP, the system enables MAVs and other autonomous robots to potentially fly faster, more efficiently, and more safely. Further details regarding the specific aspects of the system are provided below.

(4) SPECIFIC ASPECTS

As noted above the system provides (1) ROI direct gradient-based time-to-contact estimation 302, (2) detection 304 and avoidance 306 of obstacles, and, optionally, (3) robustness to camera rotations by adjusting for frame-to-frame rotations 308. In the following sections, each component will be described in detail.

(4.1) ROI Direct Gradient-Based TTC Estimation

In order to estimate the time-to-collision 302, the assumption is first made that the camera is moving mostly forward with relatively little rotation (robustness to camera rotations is achieved as mentioned below). Next, it is assumed that any obstacles can be approximated by a planar surface by way of Horn et al.'s direct gradient-based TTC estimation algorithm for planar surfaces (see Literature Reference No. 2). However, instead of simply applying it to one region or segmentation of the image (as done by Horn et al.), the approach is applied to multiple sub-regions of the image. A moving average is then used to smooth out the noisy TTC estimations in order to get robust TTC values.

An example of Horn's estimation algorithm and its modifications as applied to the present invention is provided below. The TTC is essentially the ratio of distance to velocity. Horn's estimation algorithm teaches a method to recover this ratio directly using the constant brightness assumption and the derivatives of image brightness. In the present invention, the entire image area is divided multiple sub-regions. At each sub-region, TTC values are stored within a temporal sliding window (i.e., the last N frames) and smoothed out using moving average calculation.

(4.2) Detection and Avoidance of Obstacles

(4.2.1) Obstacle Detection

To detect 304 obstacles, the TTC values are analyzed for the center ROI over the previous N frames. An obstacle is said to have occurred if the TTC values are basically low enough for a certain period of time. For example, if more than 15 TTC values are below a threshold in the past 30 frames, then it is determined that an obstacle is present.

Note that the central ROI is only considered for detecting obstacles due to the assumption that the camera is moving forward with relatively little rotation. The announcement that a collision is detected is had via evaluating the following:

$$\text{Collision} = \begin{cases} \text{true}, & \text{if } \sum_{i=1}^{N} \text{unsafe}(TTC_i) > p \cdot N \\ \text{false}, & \text{otherwise} \end{cases}$$

where $0 \leq p \leq 1$ is a parameter that is varied depending on the scene. For example, p close to 1 is used when the scene is noisy and p close to 0 is used when the scene is not noisy and stable. Additionally, $TTC_i$ is the TTC value at the i'th frame, and $$\text{unsafe}(TTC) = \begin{cases} 1, & \text{if } 0 < TTC < \text{unsafe\_threshold} \\ 0, & \text{otherwise} \end{cases}$$

where unsafe_threshold indicates the number of frames (or seconds, e.g., assuming 30 frames per second) for which a time-to-collision estimate is considered to be safe if it is greater than the unsafe_threshold. Note that it is assumed correctly that negative TTC values are safe (e.g., this can occur when obstacles are moving away from the camera).

Next, the parameters p and unsafe_threshold are interpreted. If p is close to 1, the assumption is made that obstacles exist only when there are many unsafe TTC measurements. On the other hand, if p is close to 0, the assumption is made that the unsafe TTC measurements are not very noisy and that with almost any unsafe TTC measurement an obstacle is seen. Increasing p decreases false negatives, but increases recall and precision and causes more false negatives. Decreasing p decreases the number of false negatives but drops the recall and precision rates, increasing the number of false positives.

When unsafe_threshold is high it means that collisions are more easily announced. When unsafe_threshold is low it means that collisions are less easily announced. The former will increase the number of false positives while the latter will increase the number of false negatives.

(4.2.2) Obstacle Avoidance.

After an obstacle is detected, the system must determine how to avoid the obstacle. To choose movement direction, the following logic is used. First, it is assumed that there should be movement to the left (e.g., first direction). Next, movement to the right (e.g., second, opposing direction) is only performed if the following two conditions hold:

$Stddev_{right} > Stddev_{left}$ OR $NC_{right} < NC_{left}$ $\mu_{right} < 0$ OR ($\mu_{right} >$ unsafe_threshold AND $\mu_{left} >$ unsafe_threshold) OR $NC_{right} \leq NC_{left}$ where Stddev refers to the standard deviation, NC refers to the number of collisions detected in a ROI within the past N frames, µ denotes the mean, and the subscripts "left" and "right" refer to the ROIs to the left and right of the center ROI, respectively. It should be noted that although it is assume that there should be movement to the left, the invention is not intended to be limited thereto and the left and right directions listed above can be reversed if desired. The choice of direction movement is also kept constant, once chosen, for M frames; this helps make the system more robust to noise in the TTC calculations. A hysteresis threshold can also be used for this as well.

The intuition behind this movement logic is as follows. If the variation of TTCs on the right side of the image is higher than that of the left side or the number of detected collisions on the right side is lower than that of the left side, a higher confidence is warranted that an obstacle will more likely be on the left side and that therefore movement to the right is indicated. If the mean TTC value for the right side is negative, this indicates that any potential objects are getting farther away and thus that movement to the right is warranted. If both the mean of the left and right sides are higher than the unsafe threshold and the standard deviation of the right side is higher than that of the left or the number of collision of the right side is lower than that of the left, then it can be known that moving right would be better than going left. Once the path direction is determined, the system can initiate a protocol that causes a mobile platform to move in the determined path or direction. For example, if the system is mounted to an unmanned aerial vehicle (UAV) and if it is determined that the UAV should move "left" to avoid an obstacle, a move "left" command is sent to the actuators (e.g., motors, rotors, propellers, etc.) to cause the UAV to move "left".

(4.3) Robustness to Camera Rotations

To achieve robustness to camera rotations, gyroscope data is used to "undo" the frame-to-frame camera rotation (through optional adjustment for the rotation 308). After determining the gyroscope-to-camera coordinate frame transformation T via calibration, the gyroscope readings are integrated to obtain a frame-to-frame rotation in the camera coordinate frame, as follows:

$$R_c = T \cdot R_g$$

where $R_c$ is the frame-to-frame rotation in the camera coordinate frame, T is the transformation from the gyroscope coordinate frame to the camera coordinate frame, and $R_g$ is the frame-to-frame rotation in the gyroscope coordinate frame. The gyroscope and the camera are mounted on the platform (possibly very close to each other), and the transformation between the coordinate systems of camera and gyroscope is fixed and obtained manually by knowing their distance.

$R_c$ can then be applied as a homography transformation to "undo" the frame-to-frame rotation. Thus, for each pixel x in the current frame, its new location x' is determined via:

$$x' = K R_c^T K^{-1} x$$

where x is the pixel coordinate in the original frame, K is the camera calibration matrix (intrinsics), and x' is the new pixel location. With this per pixel transformation, the frame-to-frame camera rotation is essentially "undone", leaving the translational component between frames. Horn's TTC estimation equations can then be applied to achieve more accurate TTC estimations.

More specifically, the translational component between frames is then used as follows. The resulting new pixel locations (x') only with translational component (with no rotational component) is directly plugged into Horn's estimation method as done in Sections (4.1) to (4.2). This section provides the method to convert the current pixel locations to new ones, and the TTC estimation is applied to these new pixel locations. The method of this disclosure can handle motion with rotational components between frames which is a marked improvement over the prior art (e.g., Horn's method is not capable of handling such motion with rotational components).

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for collision detection and obstacle avoidance, the system comprising:
one or more processors and a memory, the memory being a non-transitory computer-readable medium having executable instructions encoded thereon, such that upon execution of the instructions, the one or more processors perform operations of:
adjusting the successive image frames to undo frame-to-frame camera rotation by determining a frame-to-frame rotation in a camera coordinate frame based on a gyroscope-to-camera coordinate frame transformation and a frame-to-frame rotation in a gyroscope coordinate frame and determining new pixel locations in a current frame based on the frame-to-frame rotation in the camera coordinate frame;
estimating time-to-contact (TTC) values, based on direct gradient-based TTC estimation, for an obstacle in multiple regions-of-interest (ROI) in each frame of successive image frames as obtained from a monocular camera, the multiple ROI including a left ROI, a right ROI, and a center ROI positioned between the left and right ROI;
based on the TTC values, detecting if there is an imminent obstacle by analyzing the TTC values for the center ROI over a previous N frames;
if there is an imminent obstacle, determining a left or right path with respect to the center ROI for avoiding the obstacle based on the TTC values in the multiple ROI, wherein determining a left or right path for avoiding the obstacle is based on a mean and standard deviation of the TTC values in different ROIs; and
causing a mobile platform to move in the left or right path as determined to avoid the obstacle.

2. The system as set forth in claim 1, wherein in estimating TTC values, the estimation is based on planar surfaces.

3. The system as set forth in claim 1, wherein detecting if there is an imminent obstacle is determined using a moving average of the TTC values.

4. The system as set forth in claim 1, wherein an obstacle is determined to be imminent if the TTC values are below a threshold for a predetermined number of frames.

5. A computer program product for collision detection and obstacle avoidance, the computer program product comprising:
a non-transitory computer-readable medium having executable instructions encoded thereon, such that upon execution of the instructions by one or more processors, the one or more processors perform operations of:
adjusting the successive image frames to undo frame-to-frame camera rotation by determining a frame-to-frame rotation in a camera coordinate frame based on a gyroscope-to-camera coordinate frame transformation and a frame-to-frame rotation in a gyroscope coordinate frame and determining new pixel locations in a current frame based on the frame-to-frame rotation in the camera coordinate frame;
estimating time-to-contact (TTC) values, based on direct gradient-based TTC estimation, for an obstacle in multiple regions-of-interest (ROI) in each frame of successive image frames as obtained from a monocular camera, the multiple ROI including a left ROI, a right ROI, and a center ROI positioned between the left and right ROI;
based on the TTC values, detecting if there is an imminent obstacle by analyzing the TTC values for the center ROI over a previous N frames;
if there is an imminent obstacle, determining a left or right path with respect to the center ROI for avoiding the obstacle based on the TTC values in the multiple ROI, wherein determining a left or right path for avoiding the obstacle is based on a mean and standard deviation of the TTC values in different ROIs; and
causing a mobile platform to move in the left or right path as determined to avoid the obstacle.

6. The computer program product as set forth in claim 5, wherein in estimating TTC values, the estimation is based on planar surfaces.

7. The computer program product as set forth in claim 5, wherein detecting if there is an imminent obstacle is determined using a moving average of the TTC values.

8. The computer program product as set forth in claim 5, wherein an obstacle is determined to be imminent if the TTC values are below a threshold for a predetermined number of frames.

9. A computer implemented method for collision detection and avoidance, the method comprising an act of:
executing, with one or more processors, instructions encoded on a non-transitory computer-readable medium, such that upon execution, the one or more processors perform operations of:
adjusting the successive image frames to undo frame-to-frame camera rotation by determining a frame-to-frame rotation in a camera coordinate frame based on a gyroscope-to-camera coordinate frame transformation and a frame-to-frame rotation in a gyroscope coordinate frame and determining new pixel locations in a current frame based on the frame-to-frame rotation in the camera coordinate frame;
estimating time-to-contact (TTC) values, based on direct gradient-based TTC estimation, for an obstacle in multiple regions-of-interest (ROI) in each frame of successive image frames as obtained from a monocular camera, the multiple ROI including a left ROI, a right ROI, and a center ROI positioned between the left and right ROI;
based on the TTC values, detecting if there is an imminent obstacle by analyzing the TTC values for the center ROI over a previous N frames;
if there is an imminent obstacle, determining a left or right path with respect to the center ROI for avoiding the obstacle based on the TTC values in the multiple ROI, wherein determining a left or right path for avoiding the obstacle is based on a mean and standard deviation of the TTC values in different ROIs; and
causing a mobile platform to move in the left or right path as determined to avoid the obstacle.

10. The method as set forth in claim 9, wherein in estimating TTC values, the estimation is based on planar surfaces.

11. The method as set forth in claim 9, wherein detecting if there is an imminent obstacle is determined using a moving average of the TTC values.

12. The method as set forth in claim 9, wherein an obstacle is determined to be imminent if the TTC values are below a threshold for a predetermined number of frames.

\* \* \* \* \*